(12) United States Patent
Chung et al.

(10) Patent No.: US 8,415,044 B2
(45) Date of Patent: Apr. 9, 2013

(54) LABEL INDICATING EXPOSURE TO MOISTURE ATTACHED TO MOLDED BATTERY CASE

(75) Inventors: Jae Sik Chung, Seoul (KR); Ki Eob Moon, Seoul (KR); Seog Jin Yoon, Seoul (KR); Cheol Woong Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 291 days.

(21) Appl. No.: 12/855,723

(22) Filed: Aug. 13, 2010

(65) Prior Publication Data

US 2010/0304190 A1    Dec. 2, 2010

Related U.S. Application Data

(62) Division of application No. 11/178,843, filed on Jul. 11, 2005, now Pat. No. 7,828,859.

(30) Foreign Application Priority Data

Jul. 9, 2004  (KR) .................. 10-2004-0053554

(51) Int. Cl.
  *H01M 10/48*  (2006.01)
(52) U.S. Cl.
  USPC .................. 429/90; 429/93; 429/7; 429/163

(58) Field of Classification Search ................ 29/623.1, 29/623.2, 623.4; 429/176, 175, 163, 186, 429/7, 65, 93, 90, 61
See application file for complete search history.

(56) References Cited

U.S. PATENT DOCUMENTS

| | | |
|---|---|---|
| 4,971,197 A | 11/1990 | Worley |
| 5,173,371 A | 12/1992 | Huhndorff et al. |
| 5,401,561 A | 3/1995 | Fisun et al. |
| 5,538,806 A | 7/1996 | Weiss et al. |
| 6,391,490 B1 | 5/2002 | Aoi et al. |
| 2006/0036032 A1* | 2/2006 | Akiyama et al. .............. 525/89 |

FOREIGN PATENT DOCUMENTS

| | | |
|---|---|---|
| GB | 770607 | 3/1957 |
| JP | 2001-312207 A | 11/2001 |
| JP | 2001312207 A | 11/2001 |

OTHER PUBLICATIONS

PCT International Search Report; PCT/KR2005/002152; Internatinal Filing Date: Jul. 7, 2005; Date of Mailing: Oct. 11, 2005.
Supplementary European Search Report mailed Nov. 22, 2012. (7 pages).

* cited by examiner

*Primary Examiner* — Raymond Alejandro
(74) *Attorney, Agent, or Firm* — Birch, Stewart, Kolasch & Birch, LLP

(57) ABSTRACT

A label indicating exposure to water is disposed in a plastic member of the battery. The label is prevented from being separated and disappeared and from being exchanged or modified arbitrarily by a battery user by having an edge of the label molded to the battery case.

5 Claims, 6 Drawing Sheets

LABEL INDICATING EXPOSURE TO MOISTURE ATTACHED TO MOLDED BATTERY CASE

This application is a divisional application based on U.S. patent application Ser. No. 11/178,843 filed on Jul. 11, 2005, which issued as U.S. Pat. No. 7,828,859 on Nov. 9, 2010. U.S. patent application Ser. No. 11/178,843 claims the benefit of Korean Patent Application No. 10-2004-53554 filed on Jul. 9, 2004 in Korea, which are hereby incorporated by reference in its entirety for all purposes as if fully set forth herein.

TECHNICAL FIELD

The present invention relates to a battery having an A/S label and a method for manufacturing the same. More particularly, the present invention relates to a battery having an A/S label and a method for manufacturing a battery, in which the A/S label is disposed in a plastic molded body of the battery, a portion of the A/S label is exposed, and the peripheral portion of the A/S label is buried in the plastic molded body. In case of the battery according to the present invention, the A/S label is prevented from being lost and from being exchanged or modified arbitrarily by a battery user.

BACKGROUND ART

In general, an A/S label of a battery functions as an indicator for, in case of disorder or inferiority of a battery, determining whether the disorder or the inferiority is caused by the carelessness of a user or by a problem of the battery itself. For example, if the battery is out of order and there is a mark which can recognize the carelessness of the user in the A/S label, the A/S label can be a useful basis to determine that the disorder is caused by the carelessness of the user.

Currently, as an example of the A/S label, a submersion label is widely used. Although the submersion label itself is not an object of disorder or A/S, it is useful in determining whether the cause of the malfunction is submersion or moisture. Namely, since the submersion label is made of a material which has a color that can be changed or spread by the contact with the water, whether the battery is submerged or not is easily confirmed by the change or spread of the color. As a result, in the case the color of the submersion label is changed or spread, it is determined that the disorder of the battery is caused by the carelessness of the user. Further, the change of the color of the submersion label can function as an indicator indirectly informing that the battery may have a problem. Generally, a battery malfunctions after contact with water. The battery can be damaged by impurities contained in the water as well as the water itself. Therefore, as an A/S label for judging whether the battery is an object of A/S or not, a submersion label having a relatively simple structure can be used, which provides a determination of whether the battery made contact with the water.

The conventional A/S label is generally attached to the outside of a battery or to a part of a battery inside of the battery case, and a portion of the A/S label is exposed to the outside through an opening hole formed in the case. As a result, the A/S label can be easily separated and lost by the contact with the water. Further, a battery user can arbitrarily attach a new A/S label to the damaged battery.

Generally, as shown in FIGS. 1 to 3, a battery (1) includes a battery cell (2) accommodating an electrolyte and an electrode assembly, and a body case (4a) and a cover case (4b) as cases for protecting battery parts including the battery cell (2). A protection circuit portion (3) can be mounted for the safety of the battery, and is connected to an electrode terminal of the battery cell.

Further, a plurality of protrusion portions (5) are generally provided at edges of the body case (4a) and the cover case (4b), and the protrusion portions fixes the battery (1) to the mounting surface of the corresponding device such as a mobile phone, etc. The protrusion portion acts as an "engaging protrusion portion." The protection circuit portion (3) is surrounded by a body case (4a) and a cover cap (6a) to be fixed as shown in FIG. 1, or the protection circuit portion 3 can be surrounded by the body case (4a) and the cover case (4b) fixed in a line with one side of upper or lower edge of the battery cell, as shown in FIGS. 2 and 3.

In the case of the conventional battery, the submersion label (7) as an A/S label is generally attached to the outside of one part selected from the group consisting of the battery cell (2), the protection circuit portion (3), the body case (4a), and the cover case (4b). However, in a case in which the submersion label is attached to the outer side of the battery, the submersion label is apt to be separated and lost when it makes contact with the water. Further, a battery user can exchange the submersion label in the submerged battery.

On the other hand, FIG. 2 (interior of a battery) and FIG. 3 (assembled state of a cover case) show a structure in which the submersion label as an A/S label is disposed in the interior of the battery. According to the structure, since after the submersion label is attached to a predetermined portion of the protection circuit portion, the battery cell, the protection circuit portion, and the submersion label is accommodated by using the cover case and the body case separately manufactured, the battery user is apt to exchange the submerged label with a new one by separating the border portions of the body case and the cover case.

DISCLOSURE OF THE INVENTION

Therefore, the present invention has been made in view of the above-mentioned problems, and it is an object of the present invention to provide a method by which a battery user cannot exchange an A/S label arbitrarily. Therefore, the present invention provides a battery whose A/S label cannot be exchanged without damaging the battery. Further, the present invention provides a method for manufacturing the battery.

Accordingly, the present invention provides a battery in which an A/S label is disposed in a plastic molded body of the battery.

Namely, the present invention provides a battery comprising a battery cell accommodating an electrolyte and an electrode assembly, a plastic molded body, and an A/S label, wherein the A/S label is disposed in the plastic molded body, a portion of the A/S label is exposed, and a circumferential portion of the A/S label is buried in the plastic molded body.

The battery according to an example of the present invention can further comprise a protection circuit portion. In the case of the battery comprising the protection circuit portion, the A/S label can be disposed in a plastic molded body for forming a protection circuit portion.

According to the present invention, the plastic molded body in which the A/S label is disposed includes all plastic bodies that can be applied to the battery. The kinds of plastic molded bodies are not restricted.

The A/S label can be disposed in all kinds of plastic molded bodies manufactured by the molding of a plastic, for example, an inner case, an outer case such as a body case or a cover case, etc., other connecting members, and a plastic molded body for the protection circuit portion.

The battery according to the present invention can prevent the A/S label of the battery from being exchanged arbitrarily by a battery use.

According to the present invention, the A/S label means any index or indicator which can determine whether the disorder is generated by a defect of the battery itself or by the carelessness of the user, when the battery is damaged or out of order.

Examples of the A/S label include a submersion label and a sealing label which is a type of sticker attached to ascertain whether a user disassembled the product arbitrarily.

According to the present invention, the submersion label can be properly applied as an A/S label.

As an example of the submersion label, a material having a color that can be changed or spread by water or a large amount of moisture is used. For example, if an ink which is dissolved in the water is coated on a substrate to form a label, the label becomes a submersion label the color of which is spread by the contact with the water. Further, if an ink, the color of which is changed by the contact with the water or a large amount of moisture, is coated on the substrate to form a label, the label becomes a submersion label the color of which is changed by the contact with the water. In the submersion label, there is no restriction in the change of the color. For example, the ink, the original color of which can be changed to another color or can be disappeared, can be used for the submersion label.

If the ink has the above characteristics, there is no restriction on the kinds of the ink. Further, there is no restriction on the kinds of the substrate on which the ink is coated as long as the ink can be painted or coated on the substrate. Examples of the substrate include a paper and a non-woven fabric. As a representative example of the conventional submersion label, a substrate made of paper is coated with a red ink that disappears after contact with the water has been used.

The submersion label can be commercially purchased and used. Currently, submersion labels manufactured by coating ink with various kinds of colors on various kinds of substrates are commercially available.

The A/S label including the submersion label has an exposed portion so that the modification or the change of color can be observed.

In a case in which the A/S label is disposed in the plastic molded body, the A/S label cannot be separated without damage or modification of the label.

According to the present invention, a method for manufacturing a battery comprising a battery cell accommodating an electrolyte and an electrode assembly, a plastic molded body, and an A/S label, the method comprising the step of: forming the plastic molded body so that the A/S label is disposed in the plastic molded body, a portion of the A/S label is exposed, and a circumferential portion of the A/S label is buried in the plastic molded body is provided.

In one exemplary embodiment of the present invention, the step of disposing the A/S label in the plastic molded body may comprise the steps of: attaching the A/S label to an outer side of the battery cell; and locating the battery cell to which the A/S label is attached in a molding space of a mold and forming the plastic molded body by injecting a fused resin into the mold so that a portion of the A/S label is exposed to outside.

In another exemplary embodiment of the present invention, the battery can further comprise a protection circuit portion, and the step of disposing the A/S label in the plastic molded body of the battery may comprise the steps of: pre-assembling the battery cell and the protection circuit portion by fixing an electrode terminal of the battery cell and a corresponding electrode terminal of the protection circuit portion; attaching the A/S label to an outer side of one of the battery cell and the protection circuit portion; and locating the battery cell assembly comprising the battery cell, the protection circuit portion, and the A/S label in a molding space of a mold and forming the plastic molded body by injecting a fused resin into the mold so that a portion of the A/S label is exposed to the outside.

Further, the present invention provides a method for manufacturing a battery, in which a molded body of a protection circuit portion is manufactured by inserting the protection circuit portion, comprising a substrate in which a protection circuit is formed and a connection terminal that is electrically connected with the protection circuit portion, into a molding space of a mold and injecting a plastic fused material into the molding space so that a portion of the connection terminal is exposed, wherein the method comprises the steps of: attaching an A/S label to the protection circuit portion and then manufacturing the molded body of the protection circuit portion so that a portion of the A/S label as well as a portion of the connection terminal is exposed; and connecting the molded body of the protection circuit portion to a battery cell.

Figure 1:
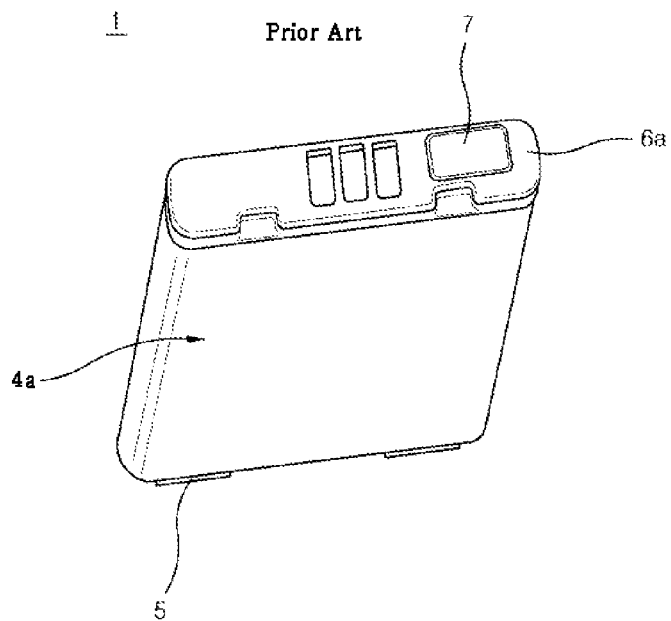
FIG. 1 is a schematic perspective view for showing an example of the conventional battery in which a submersion label is attached to an exterior portion of a battery case.
Figure 2:
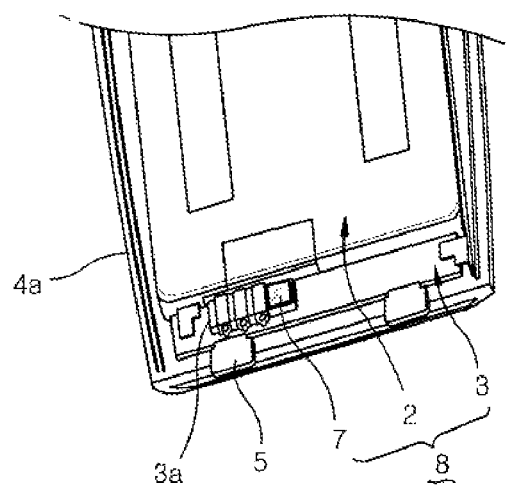
FIG. 2 is a schematic perspective view for showing an example of the conventional battery in which a submersion label is attached to an interior portion of a battery case.
Figure 3:
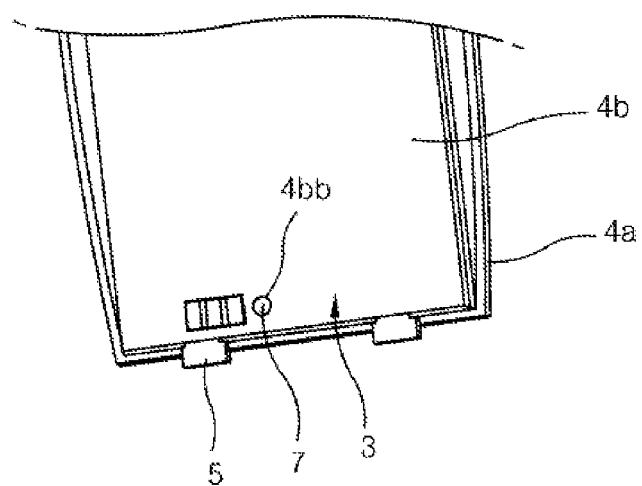
FIG. 3 is a schematic perspective view for showing the state in which the cover case is engaged with the body case of the battery according to FIG. 2.

BRIEF DESCRIPTION OF THE INDICATIONS IN THE DRAWINGS 1, 1': battery
2, 10: battery cell
3: protection circuit portion
3a: PTC (protection device)
4: outer case
4a: body case
4b: cover case
4bb: through hole
7: A/S label (submersion label)
8: battery cell assembly
22: protection circuit
26: protection circuit portion

BEST MODE FOR CARRYING OUT THE INVENTION

Reference will now be made in detail to the preferred embodiments of the present invention.

As an example of a method for disposing an A/S label in a plastic molded body, a method in which after an A/S label is disposed in one of the battery manufacturing parts before the plastic molded body is formed, for example, a battery cell, a protection circuit portion, etc., then plastic molding is performed can be applied.

According to an example of the present invention, an A/S label can be buried in a plastic molded body that is used as a case. In this example, the A/S label can be disposed in the plastic molded body used as case by disposing the A/S label in a mold for forming the case and regulating the structure of a mold so that a portion of the A/S label is exposed to the outside. A battery in which the A/S label is disposed in the plastic molded body can be manufactured by using the above case as an outer case and accommodating a battery cell therein.

Therefore, according to the present invention, a battery case in which an A/S label is disposed can be provided.

According to another example of the present invention, an outer case can be integrally formed with parts for manufacturing a battery by plastic molding. In this case, an A/S label can be disposed in a plastic molded body forming the outer case. Namely, the A/S label can be buried in the plastic molded body simultaneously with the molding of the outer case, by putting the battery manufacturing parts into the mold, disposing the A/S label at a predetermined position of one of the parts, setting the mold so that a portion of the A/S label is exposed, and then performing the plastic molding. (Refer to FIGS. 5 and 6)

As an example of such battery, there is a battery including a battery cell accommodating an electrolyte and an electrode assembly; an A/S label disposed at a predetermined portion of the outside of the battery cell; and a plastic molded body surrounding the battery cell and the A/S label so that the electrode terminal of the battery cell and a portion of the A/S label are exposed to the outside. The example corresponds to a case in which the plastic molded body forms an outer case. Namely, in the above battery, a circumferential portion of the A/S label is buried in the plastic molded body forming the outer case.

According to another example of the present invention, the battery can further include a protection circuit portion. The battery includes a battery cell accommodating an electrolyte and an electrode assembly; a protection circuit portion connected to an electrode terminal of the battery cell; an A/S label disposed at a predetermined portion of the outside of one of the protection circuit portion and the battery cell; and a plastic molded body surrounding the battery cell, the protection circuit portion, and the A/S label so that the outside electrode terminal of the protection circuit portion and a portion of the submersion label are exposed to the outside. In the example, the plastic molded body forms an outer case, the circumferential portion of the A/S label is buried in the plastic molded body.

On the other hand, a method for manufacturing a battery according to the present invention comprises a step of disposing an A/S label in a plastic molded body of the battery. In the step, the plastic molded body is formed so that a portion of the A/S label is exposed and a circumferential portion is buried in the plastic molded body. As an example of a method for disposing the A/S label in a plastic member of the battery, there is a method that, for example, in the process of manufacturing a plastic molded body used in the battery, when the A/S label is disposed, the plastic molded body is formed by setting a mold so that the A/S label is buried in the plastic molded body except for a portion of the A/S label.

According to another example of the present invention, a battery can be manufactured by a method comprising the steps of: attaching an A/S label to the outside of a battery cell; and forming a plastic molded body by locating the battery cell, to which the A/S label is attached, in the molding space of a mold and injecting a fused resin into a mold so that an electrode terminal of the battery cell and a portion of the A/S label are exposed outside. In the example, the plastic molded body can act as an outer case.

According to another exemplary embodiment of the present invention, the battery can further include a protection circuit portion and the battery can be manufactured by a method comprising the steps of: pre-assembling a battery cell and a protection circuit portion by fixing an electrode terminal of the battery cell and a corresponding terminal of a protection circuit portion; attaching the A/S label to the outside of one of the battery cell and the protection circuit portion; and forming a plastic molded body by locating a battery cell assembly, including the battery cell, the protection circuit portion and the A/S label, in a molding space of a mold and injecting a fused resin into the mold so that the electrode terminal of the protection circuit portion and a portion of the A/S label are exposed to the outside. In the example, the plastic molded body can act as an outer case.

In the step of forming the outer case, several protrusion portions may be formed at a predetermined portion of the outer case so that the battery can be stably engaged with a corresponding electronic device, for example, a mobile phone, a PDA, etc. The protrusion portions can be called as engaging protrusion portions.

According to another example of the present invention, after a protection circuit portion is separately manufactured, a battery can be manufactured by engaging the protection circuit portion with a battery cell. Namely, in a method in which a plastic molded body of the protection circuit portion is separately manufactured and the battery is manufactured by connecting the plastic molded body of the protection circuit portion to a battery cell, the A/S label can be disposed therein when manufacturing the plastic molded body of the protection circuit portion.

Namely, in the case when parts for manufacturing the protection circuit portion including a protection circuit are integrally put into a mold and the molding is performed, after the A/S label is disposed at a predetermined position of a part selected from the parts for manufacturing the protection circuit portion, the mold is set so that a portion of the A/S label is exposed, then the plastic molding can be performed. In this case, the A/S label can be disposed in the plastic molded body simultaneously with the formation of the protection circuit portion and the circumferential portion can be integrally buried in the formation body. (Refer to FIGS. 7 and 8)

For example, a battery having an A/S label disposed in a plastic member can be manufactured by a method in which a plastic molded body of a protection circuit portion is manufactured by inserting the protection circuit portion, comprising a substrate in which a protection circuit is formed and a connection terminal that is electrically connected with the protection circuit portion, into a molding space of a mold and injecting a fused material into the molding space so that a portion of the connection terminal is exposed, the method comprising the steps of: attaching an A/S label to the protection circuit portion and then manufacturing the plastic molded body of the protection circuit portion so that a portion of the A/S label is exposed; and connecting the plastic molded body of the protection circuit portion to a battery cell.

A fused resin may be used to form the plastic molded body of the present invention. The fused resin, for example, includes a thermal fused resin and a volatile fused resin. Examples of the resin include a polyimide resin, an epoxy resin, etc. Such a resin is not restricted to the above, and those skilled in the art can select and use necessary resins without restriction.

According to the present invention, the A/S label can be formed so as not to be separated. Further, the A/S label can be prevented from being exchanged arbitrarily by a battery user.

Preferred Embodiment

Hereinafter, preferred embodiments of the present invention will be described in detail with reference to accompanying drawings.

According to a preferred embodiment of the present invention, a submersion label is used as an A/S label. The submersion label used in the following preferred embodiment is one in which a red pattern is formed on a paper, and has a characteristic that the red pattern becomes transparent when the label makes contact with water.

Figure 4:
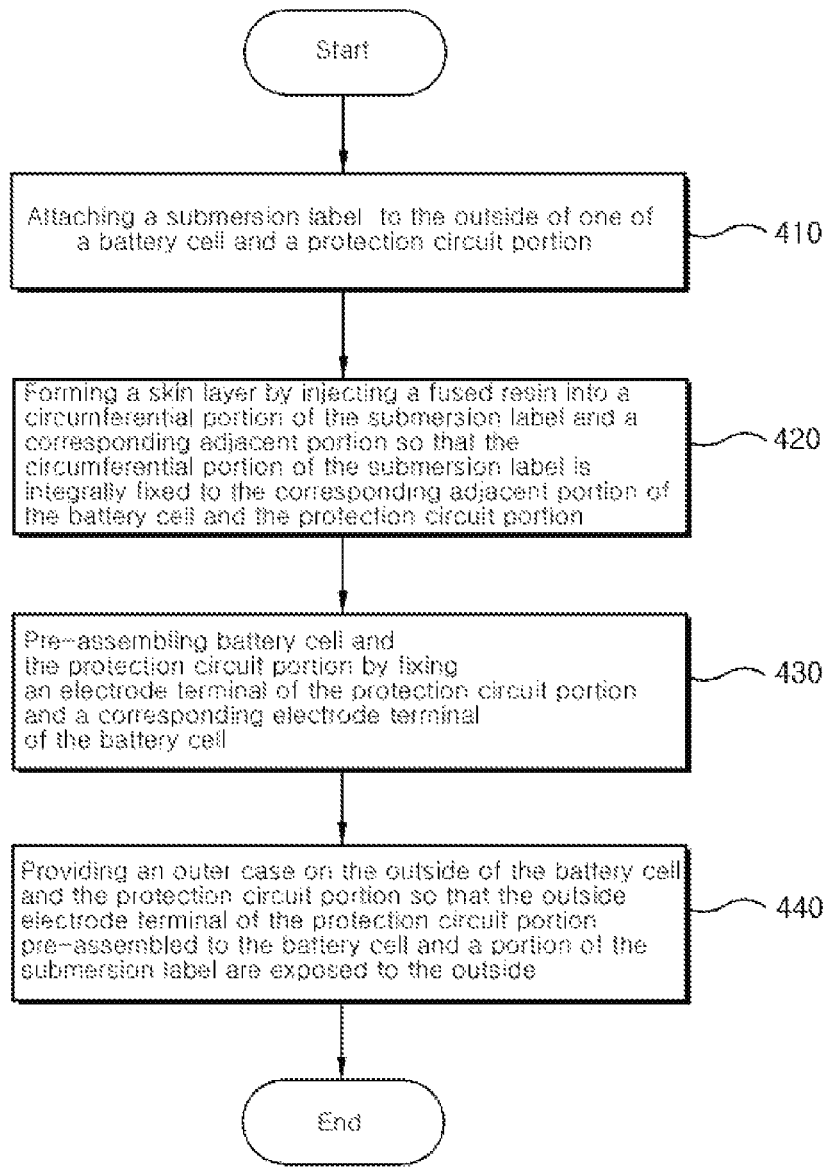
FIG. 4 is a flow chart for explaining a method for manufacturing a battery including a submersion label as an A/S label according to one exemplary embodiment of the present invention.

FIG. 4 is a preferred embodiment of a method for manufacturing a battery pack including a submersion label. As shown in FIG. 4, the method comprises the steps of:

attaching the submersion label (7) to the outside of one of a battery cell (2) and a protection circuit portion (3) (410);

forming a skin layer by injecting a fused resin into the circumferential portion of the submersion label (7) and the corresponding adjacent portion so that the circumferential portion of the submersion label (7) is integrally fixed to the corresponding adjacent portion of the battery cell (2) and the protection circuit portion (3) to dispose the submersion label in a plastic molded body (420);

pre-assembling the battery cell and the protection circuit portion (3) by fixing an electrode terminal of the protection circuit portion (3) and a corresponding electrode terminal of the battery cell (2) (430); and providing an outer case on the outside of the battery cell (2) and the protection circuit portion (3) so that the outside electrode terminal of the protection circuit portion (3) that is pre-assembled to the battery cell (2) and a portion of the submersion label (7) are exposed to the outside (440).

Here, the outer case (4) can be integrally formed, for example, by thermal-fusing an upper case and a separate lower case or by an insert molding process with a mold.

Figure 5:
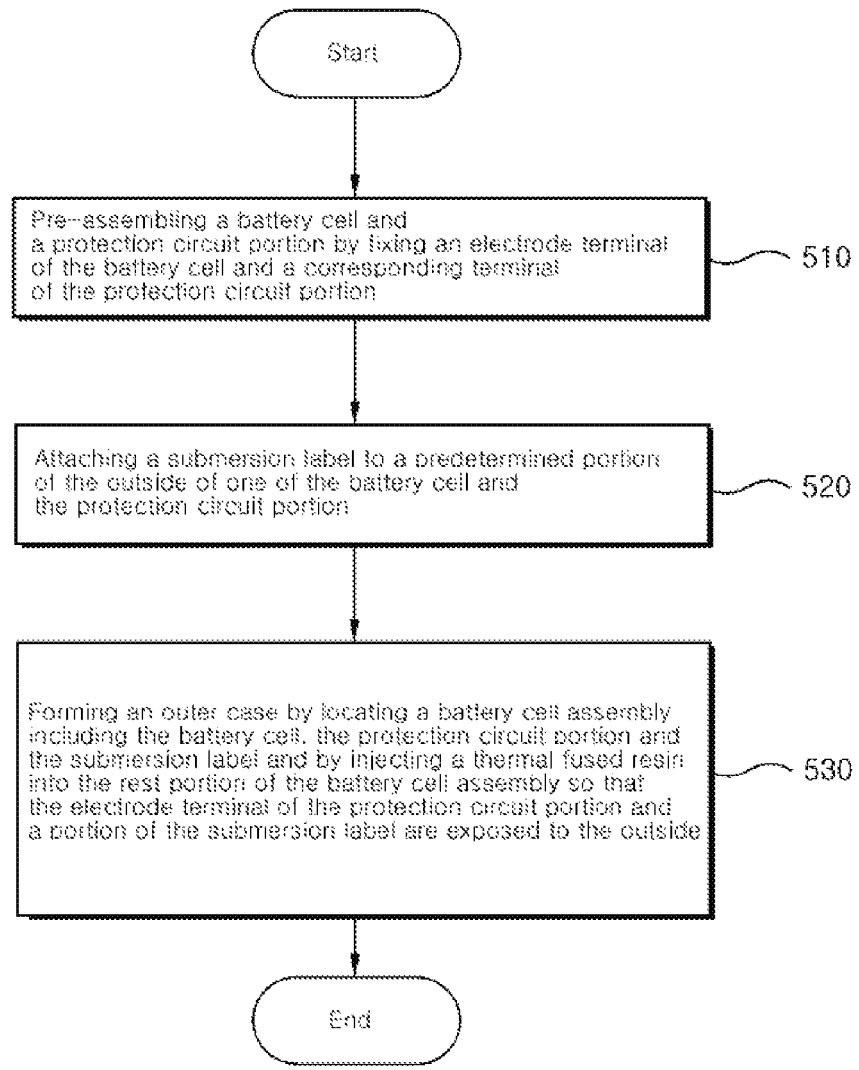
FIG. 5 is a flow chart for explaining a method for manufacturing a battery including a submersion label as an A/S label according to one exemplary embodiment of the present invention.
Figure 6:
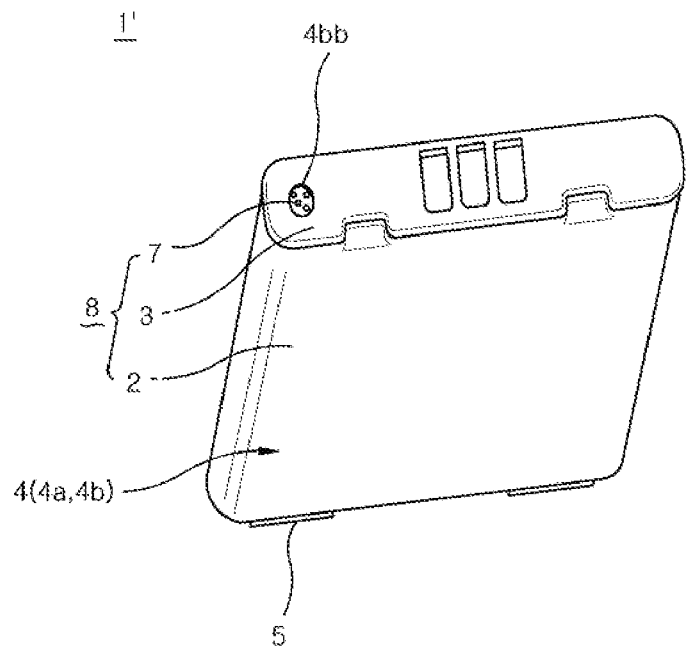
FIG. 6 is a schematic perspective view for showing a battery manufactured according to one exemplary embodiment of the present invention.

FIG. 5 shows another preferred embodiment of a method for manufacturing a battery pack including a submersion label.

According to the present embodiment, a battery including a battery cell (2) accommodating an electrolyte and an electrode assembly; a protection circuit portion (3) in which an electrode terminal of the battery cell and a corresponding electrode terminal of the protection circuit portion are connected; a submersion label (7) disposed at a predetermined portion of the outside of one of the protection circuit portion and the battery cell (2); an outer case formed of a plastic molded body surrounding the battery cell (2), a protection circuit portion (3), and a submersion label (7) so that the outside electrode terminal of the protection circuit portion (3) and a portion of the submersion label (7) are exposed to the outside. The appearance of the battery is disclosed in FIG. 6.

The battery cell (2) is a lithium ion battery which has a size of 4 Cm×4 Cm×0.5 Cm and the outer case of the cell is made of aluminum foil. The protection circuit portion (3) comprise a safety device such as PTC device (3a) that is connected to a terminal of the battery cell 2 and protecting the battery from over-current, over-discharge, and over-charge first.

First, the battery cell and the protection circuit portion are pre-assembled by fixing the terminal of the battery cell (2) and the terminal of the protection circuit portion (510). Then, a submersion label 7 is attached to the left side of the protection circuit portion (3) (520).

Thereafter, a battery cell assembly (8) including the battery cell (2), the protection circuit portion (3), and the submersion label (7) is located in the mold, and an outer case (4) of the plastic molded body is formed by injecting a thermal fused resin into the rest portion of the battery cell assembly (8) so that the electrode terminal of the protection circuit portion (3) and a portion of the submersion label (7) are exposed to the outside (530). As a result, the circumferential portion of the submersion label is buried in the plastic molded body, and a portion of the submersion label is exposed. In the step of forming the outer case (4) (530), two bonding protrusion portions (5) are formed on the lower side of the outer case (4) so that the battery pack 1' can stably engaged with an electronic device. (Refer to FIG. 6)

As the thermal fused resin, for example, a polyimide resin or an epoxy resin can be used.

Figure 7:
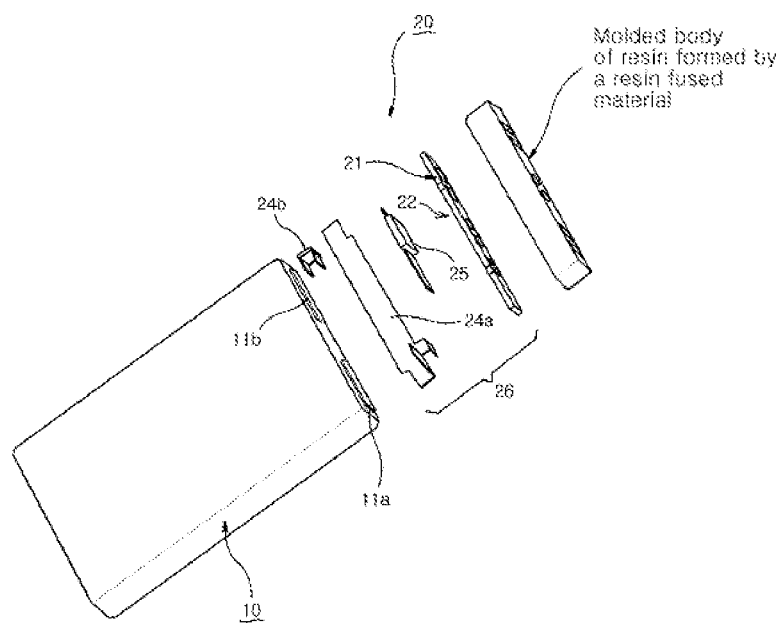
FIG. 7 is a schematic exploded view for showing a battery manufactured according to one exemplary embodiment of the present invention.
Figure 8:
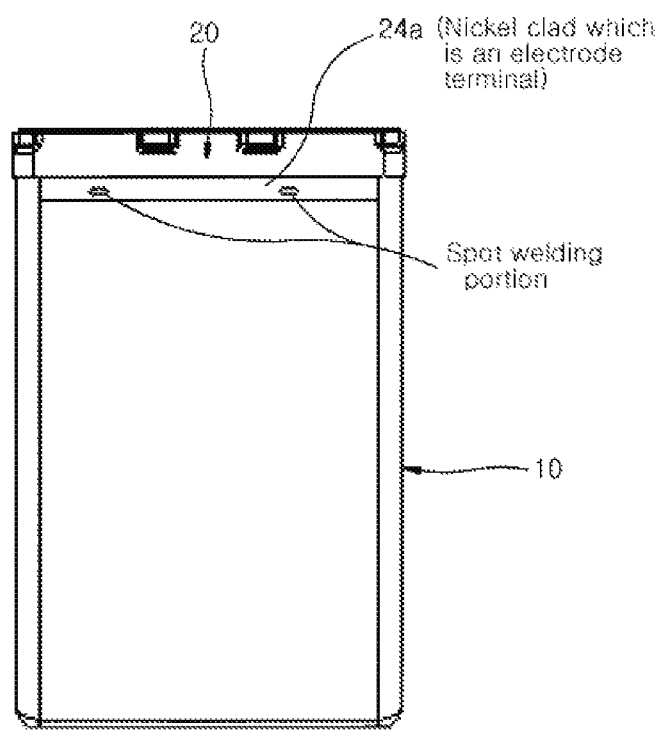
FIG. 8 is a schematic plan view for showing a battery manufactured according to one exemplary embodiment of the present invention.

FIGS. 7 and 8 shows a preferred embodiment that a protection circuit portion is formed by insert injection-molding of parts for forming the protection circuit portion and a battery is manufactured by engaging the protection circuit portion with a battery cell.

First, a negative (−) connection terminal (24b) to which a safety device (25) is selectively fixed is mounted to one side of a substrate (21) in which a protection circuit (22) is formed, and a protection circuit portion (26) is prepared by fixing a positive (+) connection terminal made of nickel clad (24a) on the other side of the substrate (21). Then, the negative (−) connection terminal (24b) and the positive (+) connection terminal made of nickel clad (24a) can be fixed to corresponding portions of the substrate (21) by welding. In addition, the submersion label as an A/S label is disposed at a portion in which the terminal is not located by using an adhesive. (Not shown in the figures)

Thereafter, after the protection circuit portion (26) in which the submersion label is disposed is located in a molding space of a mold separately from the battery cell (10), a protection circuit portion insert injection molded body (20) is manufactured by injecting a fused resin into the molding space of the mold in a state that a portion of the connection terminals (24a) and (24b) fixed to the substrate (21) of the protection circuit portion (26) and a portion of the submersion label are exposed to the outside.

The battery cell (10) is prepared separately from the step of forming an insert injection molded body of the protection circuit portion. The exposed portions of the corresponding connection terminals (24a) and (24b) of the injection molded body (20) of the protection circuit portion are connected to two electrode terminals (11a) and (11b) of the battery cell (10), and the two connection terminals (24a) and (24b) is welded to the corresponding electrode terminal (11a) and (11b) of the battery cell (10) by putting a welding tip of a spot welding device (not shown) through a opening portion (terminal portion) of the upper surface of the two connection terminal (24a) and (24b) of the injection molded body (20) of the protection circuit portion. In this case, only by welding the positive (+) connection terminal (24a), which is one of the exposed portions of the two connection terminals (24a) and (24b) of the insert injection molded body (20) of the protection circuit portion, to the corresponding electrode terminal of the battery cell (10), the rest connection terminal can maintain the electrical connection state by a resilient force, and the insert injection molded body (20) of the protection circuit portion can be integrally fixed by the welding force between the corresponding electrode terminals.

In the battery according to the present invention, the submersion label which functions as an A/S label is prevented from being separated even when the battery is submerged and from being exchanged arbitrarily by a battery user to be disguised as if the battery is not submerged.

INDUSTRIAL APPLICABILITY

The present invention relates a battery in which an A/S label is disposed in a plastic member of the battery and a method for manufacturing the same. According to the present invention, the A/S label is prevented from being separated and disappeared and from being changed or modified arbitrarily by a battery user.

The invention claimed is:

1. A battery comprising:
a battery cell accommodating an electrolyte and an electrode assembly;
a plastic molded body; and
a label,
wherein the label is disposed in the plastic molded body, a portion of the label is exposed, and a circumferential portion of the label is buried in the plastic molded body,
wherein the label is a submersion label having a color which changes or disappears with contact with water to indicate exposure of the battery to water, and
wherein the circumferential portion of the label is buried in the plastic molded body by molding a resin for forming the plastic molded body.

2. The battery according to claim 1, wherein the plastic molded body is an outer case of the battery.

3. The battery according to claim 1, wherein the label is located on the battery cell.

4. The battery according to claim 1, which further comprises a protection circuit portion.

5. The battery according to claim 4, wherein the label is located on the protection circuit portion.

* * * * *